Dec. 1, 1970    J. PICKLES    3,544,822

POWER WINDOW REGULATOR

Filed Aug. 5, 1968

INVENTOR
JOSEPH PICKLES

BY

ATTORNEYS

United States Patent Office 3,544,822
Patented Dec. 1, 1970

3,544,822
POWER WINDOW REGULATOR
Joseph Pickles, Bloomfield Hill, Mich., assignor to Ferro Manufacturing Corporation, Detroit, Mich., a corporation of Michigan
Filed Aug. 5, 1968, Ser. No. 750,324
Int. Cl. H02k 7/06
U.S. Cl. 310—83                                6 Claims

ABSTRACT OF THE DISCLOSURE

A power window regulator for automotive vehicles comprises a flat pancake motor which includes a circular array of flat permanent magnets. Epicyclic gearing is partly disposed in a central zone lying radially inwardly from the magnets and include an internal output gear connected to a window actuating arm. The motor includes a rotatable armature connected to a sun gear forming a part of the epicyclic gearing.

SUMMARY OF THE INVENTION

The invention relates to a power window regulator characterized by its compactness resulting from the provision of output gearing at least partially occupying the central portion of a pancake motor. The result is a markedly flat relatively small power unit including a combined electric motor, epicyclic gearing characterized in the capability of producing adequate power for a window regulating arm.

It is accordingly an object of the present invention to provide a combined motor and gear reduction unit for use as a window regulator.

It is a further object of the present invention to provide a novel arrangement of the components of a pancake motor employing permanent magnets and gear reduction including epicyclic gearing.

Other objects and features of the invention will become apparent as the description proceeds, especially when taken in conjunction with the accompanying drawing, illustrating a preferred embodiment of the invention.

DESCRIPTION OF THE PREFERRED EMBODIMENT

Figure 2:
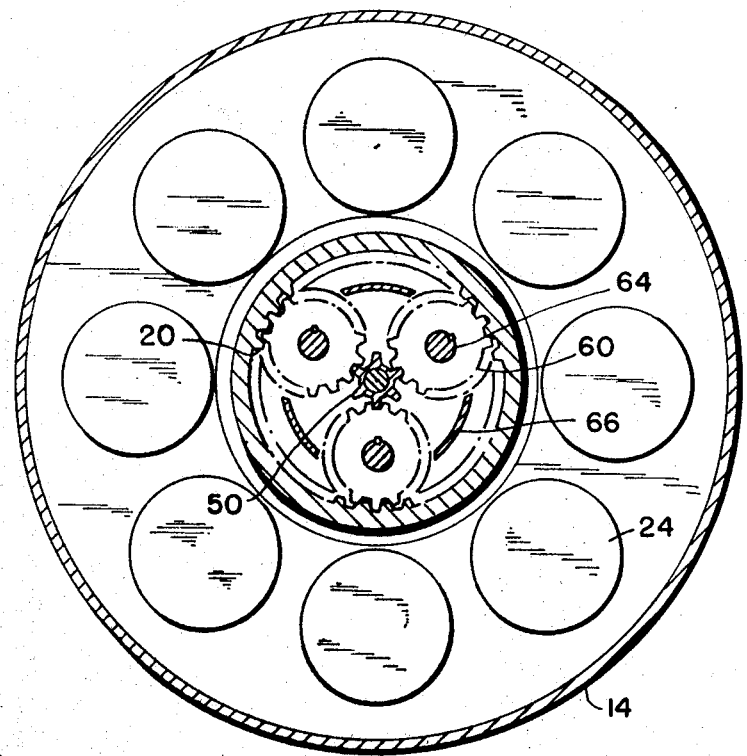
FIG. 2 is a section on the line 2—2, FIG. 1.
Figure 1:
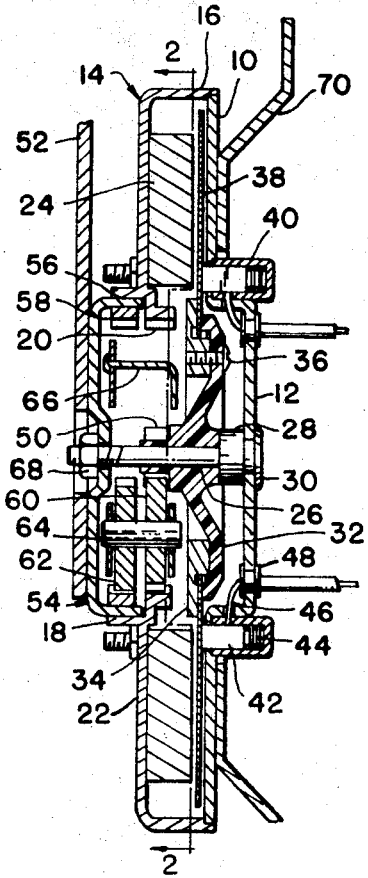
FIG. 1 is a transverse view through the power regulator.

Referring now to the drawing, the construction comprises a stationary housing comprising a plate 10 having an outwardly offset wall portion 12 and a housing member 14 having an annular flange 16. The housing member 14 is generally annular and includes at its inner periphery an outwardly extending axial flange 18 and an inwardly extending internally toother gear portion 20. As best seen in FIG. 1, the gear portion 20 is shown as integral with the housing member 14 but it may conveniently be a separate member attached to the flat wall 22 of the housing member 14. Secured to the inner surface of the flat wall 22 are a plurality of flat circular permanent magnets 24 disposed in a circular array and leaving an internal space in the plane of the magnets radially inwardly therefrom, as best illustrated in FIG. 2.

Carried by the offset wall portion 12 is a shaft 26 having an enlargement 28 and a head 30 adapted to fix the shaft 26 to the wall 12. Rotatable on the shaft 26 is an insulating coupler 32 having a ring 34 connected to its peripheral portion by clamping means such as screws 36. Clamped between the ring 34 and the outer periphery of the coupler 32 is the armature 38 of the pancake motor.

The plate 10 has brush cups 40 affixed thereto receiving spring pressed brushes or contacts 42, compression springs 44 being received within the cups 40 and urging the brushes 42 into contact with the armature. The brushes 42 are connected by conductors 46 extending through grommets 48 for connection to the battery of the motor vehicle.

The coupler 32 is provided with a sun pinion 50 which is located essentially between the planes defined by the flat end surfaces of the permanent magnets 24 and which is located in the plane of the internal gear 20.

The window regulating mechanism may be of conventional design as is well understood in the art and includes an actuating arm 52, which in the present instance is connected to a rotatable flanged cover 54 having a cylindrical flange 56 rotatable within the outwardly extending flange 18 of the housing member 14. The flange 56 has affixed to its inner surface an internal gear 58.

A set of three pairs of planet gears 60 and 62 are provided, the gears 60 and 62 of each pair being fixed to a shaft 64 and the three pairs of gears being mounted on a spider 66 which retains the gears in the relationship illustrated in the figures.

It will be apparent that the planet gears 60 are in mesh with the sun gear 50 and the stationary internal gear 20 carried by or forming a part of the housing member 14. The planet gears 62 are in mesh with the internal gear 58 which is fixed to the rotatable flanged cover 54. The cover 54 is retained in place by a nut 68 carried by the shaft 26. The cover 54 is supported and guided for rotation primarily by the outwardly extending flange 18 formed on the housing member 14.

With the foregoing construction it will be apparent that rotation of the armature 38 is transmitted to the coupler 32 carrying the sun gear 50. Rotation of the sun gear 50 causes the planet gears 60, which are in mesh therewith and simultaneously in mesh with the internal gear 20, to revolve around the internal gear 20. This movement of the gears 60 is transmitted through the shaft 64 to the other planet gears 62 which are in mesh with the output internal gear 58. The number of teeth of the gears 60 and 62 and of the gears 20 and 58 are selected to be of such difference as to provide a relatively great reduction between the driving sun gear 50 and the output internal gear 58.

The entire assembly occupies a minimum of space and may be attached to internal door structure by mounting brackets 70 so as to provide adequate support for the actuating arm 52. The output gearing is particularly designed to permit it to occupy space available centrally of the pancake motor so that the entire assembly including the motor and the output gearing is well adapted to be positioned within the narrow confines of door structure or body structure of an automotive vehicle.

The drawing and the foregoing specification constitute a description of the improved power window regulator in such full, clear, concise and exact terms as to enable any person skilled in the art to practice the invention, the scope of which is indicated by the appended claims.

What I claim as my invention is:

1. A window regulator comprising a generally flat circular housing formed by a pair of parallel housing members one of which has an outer peripheral cylindrical flange, one of said housing members having an enlarged circular opening centrally thereof provided with a cylindrical guide flange, a rotatable cover plate having a peripheral cylindrical flange supported and guided for rotation by the guide flange of said one housing member, in which the peripheral flange and the guide flange are concentric and in extended surface contact, a circular array of permanent magnets within said housing, a rotatable flat armature within said housing and spaced axially from said magnets, a sun gear fixed to said armature within the plane of said magnets, a first internal gear coplanar with said sun gear and fixed within said housing, a second internal gear coaxial with and spaced axially from said first internal gear and fixed to said cover plate, a planet pinion set in mesh with said sun gear and internal gears, and output means connected to said cover plate.

2. A regulator as defined in claim 1 in which the cylindrical guide flange on said one housing member extends outwardly of said housing.

3. A regulator as defined in claim 2 in which the peripheral flange on said cover plate lies within said guide flange.

4. A regulator as defined in claim 3 in which said second internal gear is fixed to the interior of the peripheral flange on said cover plate.

5. A regulator as defined in claim 1 in which said armature is annular and comprises a circular coupler having a hub on which the teeth of said sun gear are formed and having peripheral clamping means engaging the inner edge of said armature.

6. A regulator as defined in claim 1 in which said housing and rotatable cover constitute the complete enclosure for the motor and said gearing.

References Cited
UNITED STATES PATENTS

| | | | |
|---|---|---|---|
| 2,430,769 | 11/1947 | Hutchinson | 310—66 |
| 2,784,332 | 3/1957 | Kober | 310—268 |
| 3,373,528 | 3/1968 | Tinder | 49—349 |
| 3,422,704 | 1/1969 | Catlett | 74—801 |
| 3,440,765 | 4/1969 | Eskra | 49—349 |
| 3,421,390 | 1/1969 | Lohr | 74—801 |

MILTON O. HIRSHFIELD, Primary Examiner

R. SKUDY, Assistant Examiner

U.S. Cl. X.R.

310—89, 154, 268